United States Patent Office 3,373,163
Patented Mar. 12, 1968

3,373,163
N-METHYL-PIPERAZIDES OF ALICYCLIC AND HETEROCYCLIC CARBOXYLIC ACIDS
Heinz Loewe, Kelkheim, Taunus, Josef Urbanietz, Schwalbach, Taunus, and Georg Lämmler, Giessen, Germany, assignors to Farbwerke Hoechst Aktiengesellschaft vormals Meister Lucius & Bruning, Frankfurt am Main, Germany, a corporation of Germany
No Drawing. Filed Jan. 18, 1966, Ser. No. 521,445
Claims priority, application Germany, Jan. 27, 1965,
F 45,069
6 Claims. (Cl. 260—268)

The present invention relates to carboxylic acid-N-methyl-piperazides corresponding to the general Formula I

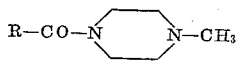
(I)

and to their physiologically tolerable salts as well as to a process for preparing them.

In the above-mentioned formula R represents an aliphatic radical containing 3 to 6 carbon atoms which may be branched, or a cycloaliphatic radical containing 5 to 7 carbon atoms which, in addition, may contain a double linkage, an endomethylene group, an oxygen or a sulfur atom or the imino group or which may be substituted by a methyl group.

The process is materialized by (a) reacting a reactive derivative of a carboxylic acid of the Formula II

 (II)

with N-methyl-piperazine, or (b) reacting a carboxylic acid-piperazide of the Formula III

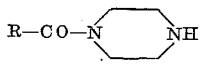
(III)

with a methylating agent or (c) hydrogenating a carboxylic acid-N-methyl-piperazide of the Formula IV

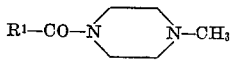
(IV)

in which $R^1$ represents a radical containing multiple linkages which is converted into the radical R by hydrogenation, or (d) reacting a carboxylic acid amide of the Formula V

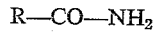 (V)

with inorganic esters of N-methyl-bis-(β-hydroxy-ethyl)-amine and, if desired, by converting the products obtained into the corresponding salts by means of physiologically tolerable acids.

(a) As reactive derivatives of carboxylic acids which are used as starting substances for the process according to (a), there are particularly suitable the acid chlorides, but other reactive derivatives such, for example, as carboxylic acid fluorides, carboxylic acid bromides, carboxylic acid esters, carboxylic acid anhydrides, carboxylic acid azides, mixed anhydrides with carbonic acid semi-esters, carboxylic acid imidazolides and the like may likewise be used. They are derived, for instance, from butyric acid, isobutyric acid, valeric acid and its isomers, caproic acid and its isomers, cyclopentane-carboxylic acid, cyclohexane-carboxylic acid, or cyclohexene-carboxylic acid and their methyl-substituted homologs, endomethylene-cyclohexane-carboxylic acid or tetrahydropyrane-carboxylic acid.

When reacting acid chlorides with N-methyl-piperazine, the presence of a solvent is preferred. As solvents there are used, for instance, aliphatic or aromatic hydrocarbons such as benzine, benzene or toluene, ethers such as diethyl ether, diisopropyl ether, anisol, tetrahydrofurane or dioxane, esters such as ethyl- or butyl-acetate, ketones such as acetone or methyl-ethylketone, amides such as dimethylformamide or nitriles such as acetonitrile. The reaction can be carried out at a low temperature as well as at an elevated temperature, for instance, at the boiling temperature of the solvent. It is of advantage to start the reaction at room temperature and to complete it by heating, for instance to the boiling point of the solvent.

If the reactants are used in equimolar amounts, the hydrochlorides of the piperazides are formed, which, according to the solvent selected, can largely be separated in crystalline form and isolated by filtration. It is likewise possible to remove the hydrogen halide liberated in the course of the reaction by means of acid-binding agents, for instance inorganic bases such as sodium carbonate or sodium hydroxide or tertiary amines such as, for example, triethylamine, dimethylaniline or pyridine, or likewise an excess amount of piperazine. When operating in this way, the free carboxylic acid piperazides are formed, which in most cases remain in dissolved state and which can be recovered in the usual manner, for instance by evaporation of the solution. If necessary, greasy by-products are removed by filtration. The carboxylic acid-N-methyl-piperazides are purified by distillation under reduced pressure.

The piperazine can be used for the reaction also in the form of a salt. In this case, the acid-binding agent is used in excess so that the free base is formed from the piperazine salt. The free carboxylic acid piperazides thus obtained can be isolated as described above. The other reactive carboxylic acid derivatives mentioned above can be reacted with N-methylpiperazine in an analogous manner.

If, according to the invention, mixed anhydrides with carbonic acid semi-esters are used as starting materials, it is of advantage to react corresponding carboxylic acids in an appropriate solvent, for example, dioxane or tetrahydrofurane, at temperatures between −20 and +30° C., preferably at −10° C., in the presence of a tertiary base, for example triethylamine, with a carbonic acid semi-ester, for instance, chloroformic acid-tert.-butylester and to have the mixed anhydride thus formed reacted with N-methyl-piperazine. The latter reaction stage can be carried out at temperatures between −20 and +50° C. It is suitable to start at a temperature below 0° C. to complete the reaction at room temperature.

(b) The products can likewise be obtained by methylation of a carboxylic acid piperazide of the formula

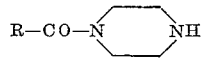

As methylating agents the methyl esters of strong inorganic acids, such as methyl iodide, methyl bromide, dimethyl sulfate and p-toluene-sulfonic acid methyl ester are appropriate.

The methylation is carried out in neutral solvents such as alcohol, dioxane or nitrobenzene. It is, however, likewise possible to operate in alkaline solution, by adding the methylating agent to an alkaline solution of the carboxylic acid piperazide.

(c) A further process for preparing carboxylic acid-N-methyl-piperazide consists in the hydrogenation of compounds of the Formula IV which in the carboxylic acid radical contain one or several multiple linkages. The carboxylic acid part may be derived, for instance, from unsaturated aliphatic carboxylic acids such, for instance, as crotonic acid, butene-carboxylic acid, isopentene-carboxylic acid, butadiene-carboxylic acid, isohexene-carboxylic acid, isohexadiene-carboxylic acid or from cyclic carboxylic acids containing double linkages, for instance benzoic acid, cyclohexene-carboxylic acid and cyclohexadiene-carboxylic acid. Triple linkages may likewise be present in the carboxylic acid part.

The hydrogenation is performed in known manner by means of Adams catalysts, for instance platinum or palladium or nickel catalysts, in appropriate solvents such as water, alcohols, acetic ester, glacial acetic acid or mixtures of said solvents, if desired with addition of mineral acid at a preferably elevated temperature and under elevated pressure in an atmosphere of hydrogen.

(d) Furthermore, it is possible to use for the process according to the invention inorganic esters of N-methyl-($\beta$-hydroxy-ethyl)-amine, for instance, N-methyl-($\beta$-chloro-ethyl)-amine, N-methyl-($\beta$-bromo-ethyl)-amine or N-methyl-($\beta$-sulfone-hydroxy-ethyl)-amine, and to react these with carbonic acid amides of the Formula V. The reaction is carried out in non-polar solvents, preferably toluene, and suitably at an elevated temperature, for instance the boiling temperature of the solvent, in the presence of very strong alkaline agents such as sodium-amide or potassium-amide, sodium-hydride or sodium-phenyl.

The carboxylic acid piperazides obtained according to the invention are monoacid bases and form salts with inorganic and organic acids which in most cases are obtained in crystalline form. As acids suitable for the formation of salts there are named, for instance, hydrochloric acid, acetic acid, citric acid and maleic acid. The salts are more or less readily soluble in water.

The products obtained according to the process of the present invention show a strong anthelmintic activity, above all on filariae. Filariasis is widely spread, particularly in tropical countries. Compared with the known N,N-diethyl-4-methyl-1-piperazine-carboxamide the products obtained according to the invention show an increased efficiency against the filaria *Litosomoides carinii* as shown by the following comparison:

Cotton rats infected with *Litosomoides carinii* were treated orally or subcutaneously on five successive days with varying doses of the compound to be examined. After a certain number of days following the start of the treatment, the decrease in percent of the micro filariae was determined in comparison with the initial value and the average value was ascertained from the values found.

| Dose subcutaneously administered | Cotton rats animal death rate in percent cyclohexane-carboxylic acid-N-methyl-piperazide | Cotton rats animal death rate in percent N,N-diethyl-4-methyl-1-piperazine-carboxamide |
| --- | --- | --- |
| 5×450 | 0 | 10 |
| 5×550 | 0 | 80 |
| 5×650 | 0 | |
| 5×750 | 30 | |
| Dosis tolerata maxima/kg. (mg.) | 5×650 | 5×400 |

| Dose orally administered | Mice animal death rate in percent tetrahydro-pyrane-4-carboxylic acid-N-methyl-piperazide | Mice animal death rate in percent N,N-diethyl-4-methyl-1-piperazine-carboxamide |
| --- | --- | --- |
| 1×1,500 | 0 | 100 |
| 1×1,750 | 20 | 100 |
| 1×2,000 | 20 | |
| Dosis tolerata maxima/kg. | 1×1,500 | 1×580 |

The products obtained according to the process of the present invention can be used as such or in the form of their salts with non-toxic acids, if desired in admixture of pharmaceutically tolerable inert auxiliary and carrier substances, orally or parenterally, preferably orally. They are preferably used in the form of tablets or suspendable powders which when given to animals can be mixed with the food. A powder suspendable in water may contain a carrier and auxiliary such as finely divided silicic acid or a dispersing agent such as coconut lorol sulfonate in addition to the products of the invention. For the preparation of tablets the usual substances known as bases for tablets, such for instance as maize starch, lactose, pectins, above all ultra-amylopectin (Na-amylopectin-glycolate), talc and the like are used. In certain therapeutical cases other anthelmintics and/or antibiotics may be admixed. The galenic preparations are produced according to the usual methods.

The following examples serve to illustrate the invention but they are not intended to limit it thereto:

*Example 1*

To a mixture consisting of 20 grams of N-methyl-piperazine, 20 grams of triethylamine, and 400 ml. of ethyl acetate, a solution of 21.4 grams of butyric acid chloride in 50 milliliters of acetic ester is added dropwise with stirring. Upon termination of the dropping in, stirring is continued for a further 2 hours, the triethyl-amine-hydrochloride which separates is filtered off with suction and the solvent is evaporated under reduced pressure. 200 milliliters of absolute ether are added to the residue, the brownish greasy substance which is hereby formed in a small amount is removed by filtration with charcoal, the ether is evaporated and the residue

| Preparation | Dose | Decrease of micro filariae in percent (days after start of treatment) | | | | Average value |
| --- | --- | --- | --- | --- | --- | --- |
| | | 6 | 12 | 18 | 24 | |
| Cyclohexane-carboxylic acid N-methyl-piperazide. | 5× 30 mf./kg. subcutaneously. | 96.8 | 93.9 | 74.6 | 86.5 | 88.2 |
| N,N-diethyl-4-methyl-1-piperazine-carboxylic amide. | ___do___ | 93.2 | 75.2 | 67.6 | 63.1 | 74.7 |

It results therefrom that the products obtained according to the present invention are distinctly superior to N,N-diethyl-4-methyl-1-piperazine carboxylic amide. Moreover, the toxicity of the products of the invention is inferior to that shown by N,N-diethyl-4-methyl-1-piperazine-carboxamide. The toxicity was determined by treating 10 mice each orally or 10 rats each subcutaneously with differently high doses and by ascertaining the animal death rate.

is distilled. 28 grams of butyric acid-(N-methyl-piperazide) are obtained.

In order to convert the compound into the maleinate, it is added to a solution of 19 grams of maleic acid in 200 milliliters of ethyl acetate, whereby the maleinate separates. Yield 42 grams showing a melting point of 94° C. (from ethylacetate).

In the same manner the following N-methyl-piperazides, which may analogously be converted into their maleinates by reaction with molar amounts of maleic acid, are obtained from molar quantities of the corresponding acid-chloride:

| Formula of the chloride | Formula of the N-methylpiperazide | Boiling point of the base, mm. | Melting point of the maleinate, deg. |
|---|---|---|---|
| (b) (CH₃)₂CH—COCl | (CH₃)₂CH—CO—N(piperazide)N—CH₃ | 100–102°/4 | 137 |
| (c) CH₃—(CH₂)₃—COCl | CH₃—(CH₂)₃—CO—N(piperazide)N—CH₃ | 120–123°/3 | 104 |
| (d) (CH₃)₂CH—CH₂—COCl | (CH₃)₂CH—CH₂—CO—N(piperazide)N—CH₃ | 117–119°/4 | 118 |
| (e) CH₃—(CH₂)₄—COCl | CH₃—(CH₂)₄—CO—N(piperazide)N—CH₃ | 133–134°/4 | 115 |
| (f) (CH₃—CH)(CH₃—CH₂)CH—COCl | (CH₃—CH₂)(CH₃—CH₂)CH—CO—N(piperazide)N—CH₃ | 116–118°/4 | 145 |
| (g) (CH₃)₂CH—CH₂—CH—COCl | (CH₃)₂CH—CH₂—CH—CO—N(piperazide)N—CH₃ | 120–122°/4 | 84 |
| (h) (CH₃)₂CH—C(CH₃)₂—COCl | (CH₃)₂CH—C(CH₃)₂—CO—N(piperazide)N—CH₃ | 121–123°/4 | 133 |
| (i) cyclopentyl—COCl | cyclopentyl—CO—N(piperazide)N—CH₃ | 138–140°/4 | 141 |
| (j) cyclohexyl—COCl | cyclohexyl—CO—N(piperazide)N—CH₃ | 146°/3 | 156 |
| (k) tetrahydropyranyl—COCl | tetrahydropyranyl—CO—N(piperazide)N—CH₃ | 176–178°/7 | 149 |
| (l) 1-methyl-cyclohexenyl—COCl | 1-methyl-cyclohexenyl—CO—N(piperazide)N—CH₃ | 153°/4 | 134 |
| (m) bicyclo[2.2.1]hept-5-ene-2-yl—COCl | bicyclo[2.2.1]hept-5-ene-2-yl—CO—N(piperazide)N—CH₃ | 156–159°/5 | 177 |

Instead of the maleinates, the citrates can be prepared in an analogous manner by reaction of the free bases with molar amounts of citric acid: for instance, 10.5 grams of cyclohexane-carboxylic acid-(N-methyl-piperazide) are added to a solution of 9.6 grams of citric acid in 150 milliliters of acetone. The citrate which at first separates in the form of a grease becomes solid when heated again on the steam bath. After filtering with suction and recrystallization from alcohol: yield 18 grams of a melting point of 125° C.

*Example 2*

To a solution of 20 grams of N-methylpiperazine in 200 milliliters of ethyl-acetate a solution of 21.4 grams of butyric acid chloride in 50 milliliters of ethyl-acetate is added while stirring. The temperature spontaneously rises to 58 C. and an oil precipitates which solidifies after some time. After cooling, it is filtered off with suction and washed out with ethyl-acetate. In order to remove the admixed N - methyl-piperazine-hydrochloride, the crude product is taken up in 300 milliliters of chloroform, the undissolved N-methyl-piperazine-hydrochloride is filtered off and the filtrate is concentrated by evaporation. Upon addition of ethyl-acetate the pure butyric acid - (N-methyl-piperazide) - hydrochloride separates, which is recrystallized from a mixture of butanol and ethyl-acetate. After drying on the steam bath: Yield 14 grams of a melting point of 157–159° C.

We claim:

1. A member selected from the group consisting of a carboxylic acid-N-methyl-piperazide and its physiologically tolerable salts, said piperazide having the formula $$R-CO-N\underset{}{\underbrace{\phantom{XXX}}}N-CH_3$$

wherein R is a member selected from the group consisting of:
- (A) saturated and olefinically mono-unsaturated cycloaliphatic hydrocarbons having 5–7 carbon atoms;
- (B) such hydrocarbons having a monomethyl substituent thereon;
- (C) bicyclo[2.2.1] hept-5-ene-2-yl; and
- (D) 4-tetrahydro pyranyl.

2. A member selected from the group consisting of cyclopentane carboxylic acid - N - methyl-piperazide and its physiologically tolerable salts.

3. A member selected from the group consisting of cyclohexane carboxylic acid-N-methyl-piperazide and its physiologically tolerable salts.

4. A member selected from the group consisting of tetrahydro pyrane-4-carboxylic acid-N-methyl-piperazide and its physiologically tolerable salts.

5. A member selected from the group consisting of 1-methyl-cyclohexene - (3) - carboxylic acid-N-methyl-piperazide and its physiologicaly tolerable salts.

6. A member selected from the group consisting of bicyclo [2.2.1] hept-5-ene-2-carboxylic acid-N-methyl-piperazide and its physiologically tolerable salts.

References Cited

UNITED STATES PATENTS 3,147,261  9/1944  Mod et al. _____ 260—268

OTHER REFERENCES

Keller et al., J. Amer. Pharm. Assoc., vol. 41 (1952), pp. 301–2.

HENRY R. JILES, *Primary Examiner*.

ALEX MAZEL, *Examiner*.